United States Patent
Reh et al.

(10) Patent No.: US 10,212,791 B2
(45) Date of Patent: Feb. 19, 2019

(54) MULTIMODE SWITCH FOR COMMISSIONING OF FUNCTIONAL WIRELESS LIGHTING GROUPS

(71) Applicant: FABRIQ, LTD., Boulder, CO (US)

(72) Inventors: Jeffrey G. Reh, Longmont, CO (US); Matthew B. O'Kelley, Boulder, CO (US)

(73) Assignee: Fabriq, Ltd., Boulder, CO (US)

( * ) Notice: Subject to any disclaimer, the term of this patent is extended or adjusted under 35 U.S.C. 154(b) by 0 days.

(21) Appl. No.: 15/924,632

(22) Filed: Mar. 19, 2018

(65) Prior Publication Data

US 2018/0288857 A1 Oct. 4, 2018

Related U.S. Application Data

(63) Continuation of application No. 15/479,067, filed on Apr. 4, 2017, now Pat. No. 9,924,581.

(51) Int. Cl.
| | |
|---|---|
| H05B 33/00 | (2006.01) |
| H05B 37/02 | (2006.01) |
| H05B 33/08 | (2006.01) |
| H04W 88/16 | (2009.01) |
| H04L 29/08 | (2006.01) |

(52) U.S. Cl.
CPC ......... *H05B 37/0272* (2013.01); *H04L 67/10* (2013.01); *H04W 88/16* (2013.01); *H05B 33/0845* (2013.01)

(58) Field of Classification Search
CPC ...... G06F 3/017; G06F 3/016; G06F 3/04842; G06F 3/0488; G06F 8/65; G06F 17/28; G06F 17/30247; G06F 17/30557; G06F 17/30864; G06F 21/00; G06F 21/31; G06F 21/32; G06F 3/0481; G06F 3/013
See application file for complete search history.

(56) References Cited

U.S. PATENT DOCUMENTS

| | | |
|---|---|---|
| 7,020,701 B1 | 3/2006 | Gelvin et al. |
| 7,307,542 B1 | 12/2007 | Chandler et al. |
| 7,382,271 B2 | 6/2008 | McFarland |
| 7,400,594 B2 | 7/2008 | Pereira et al. |
| 7,623,042 B2 | 11/2009 | Huizenga |
| 7,889,051 B1 | 2/2011 | Billig et al. |
| 7,925,384 B2 | 4/2011 | Huizenga et al. |
| 7,953,327 B2 | 5/2011 | Pereira et al. |
| 8,049,434 B2 | 11/2011 | Crouse et al. |
| 8,159,156 B2 | 4/2012 | Henig et al. |

(Continued)

*Primary Examiner* — Monica C King
(74) *Attorney, Agent, or Firm* — Richard K. Huffman

(57) ABSTRACT

A multimode switch is provided that has a wireless transceiver, a line voltage switch, and a switch controller. The wireless transceiver is configured to transmit and receive messages over a wireless network. The line voltage switch is coupled to a line voltage and to one or more wireless devices. The switch controller, responsive to first messages received over the wireless network, is configured to direct the line voltage switch to provide the line voltage to, and subsequently remove line voltage from, the one or more wireless devices, and is configured to receive first identifying information and functional group designation for the one or more wireless devices in second messages over the wireless network, and is configured to thereafter control the one or more wireless devices according to the identifying information and functional group designation via transmission of third messages over the wireless network.

20 Claims, 4 Drawing Sheets

(56) References Cited

U.S. PATENT DOCUMENTS

| | | |
|---|---|---|
| 8,264,168 B2 | 9/2012 | Feri et al. |
| 8,265,674 B2 | 9/2012 | Choong et al. |
| 8,290,437 B2 | 10/2012 | Simons et al. |
| 8,373,362 B2 | 2/2013 | Chemel et al. |
| 8,422,401 B1 | 4/2013 | Choo-Choong et al. |
| 2007/0121648 A1 | 5/2007 | Hahn |
| 2008/0030075 A1 | 2/2008 | Stanley et al. |
| 2009/0026966 A1 | 1/2009 | Budde et al. |
| 2009/0045939 A1 | 2/2009 | Holland et al. |
| 2009/0066473 A1 | 3/2009 | Simons |
| 2011/0043116 A1 | 2/2011 | Schenk et al. |
| 2011/0090042 A1 | 4/2011 | Leonard et al. |
| 2011/0199004 A1 | 8/2011 | Henig et al. |
| 2012/0068822 A1 | 3/2012 | Sheikman et al. |
| 2012/0194083 A1 | 8/2012 | Henig et al. |
| 2012/0242231 A1 | 9/2012 | Yianni et al. |
| 2014/0001963 A1 | 1/2014 | Chobot et al. |
| 2015/0319006 A1 | 11/2015 | Plummer et al. |
| 2017/0142814 A1 | 5/2017 | Reh et al. |
| 2017/0142815 A1 | 5/2017 | Reh et al. |

AUTONOMOUS CREATION OF FUNCTIONAL WIRELESS LIGHTING GROUPS METHOD

MULTIMODE SWITCH FOR COMMISSIONING OF FUNCTIONAL WIRELESS LIGHTING GROUPS

CROSS-REFERENCE TO RELATED APPLICATIONS

This application is a continuation of the following U.S. Patent Application, each of which is herein incorporated by reference for all intents and purposes.

| SER. NO. | FILING DATE | TITLE |
|---|---|---|
| 15/479,067 (FBQ.1011) | Apr. 4, 2017 | SYSTEM FOR AUTONOMOUS COMMISSIONING AND HARVESTING OF FUNCTIONAL WIRELESS LIGHTING GROUPS |

This application is related to the following U.S. Nonprovisional Patent Applications, each of which has a common assignee and common inventors.

| SER. NO. | FILING DATE | TITLE |
|---|---|---|
| 14/876,340 (FBQ.1009) | Oct. 6, 2015 | APPARATUS AND METHOD FOR CREATING FUNCTIONAL WIRELESS LIGHTING GROUPS |
| 15/419,232 (FBQ.1009-C1) | Jan. 30, 2017 | COMMISSIONING MECHANISM FOR CREATING FUNCTIONAL WIRELESS LIGHTING GROUPS |
| 15/419,288 (FBQ.1009-C2) | Jan. 30, 2017 | GROUPING OF WIRELESS DEVICES DURING COMMISSIONING |
| (FBQ.1011-C2) | | COMMISSIONING MECHANISM FOR WIRELESS LIGHTING GROUPS |

BACKGROUND OF THE INVENTION

Field of the Invention

This invention relates in general to the field building automation, and more particularly to a system for identifying, locating, grouping, and describing a plurality of wireless devices whose identities, locations, and functional groupings are unknown.

Description of the Related Art

Present day building lighting systems are generally controlled via wired interfaces, and these systems may be either monitored or unmonitored. As one skilled in the art will appreciate, there is substantial momentum to convert these wired lighting systems over to more efficient wireless lighting systems that allow for wireless control and management of devices therein. Although inventive concepts presented herein may be applied to a diverse number of wired/wireless devices and systems, for clarity purposes this disclosure will be presented in terms of an exemplary building comprising a plurality of light fixtures, along with associated switches, occupancy sensors, daylight harvesters, and other associated building automation devices. The building may be undergoing energy efficiency improvements through the installation of wireless radios in each of the light fixtures, wireless switches, wireless sensors, and wireless controls, to allow for more efficient use of electrical power.

The present inventors have observed that when a present day wireless network is created, in order to configure the network of devices for proper operation, determination of the devices' locations and functional groupings is mandatory. But present day techniques for identifying, locating, and grouping devices require that unknown devices be identified and located one device at a time, which is incredibly labor intensive, time consuming, and error prone.

When converting a system of wired devices into a controllable network of wireless devices, the process described above must be accomplished so that wireless controls and sensors throughout the building are configured to interoperate with each of the functional groups of devices in substantially the same manner as their wired controls and sensors that are being replaced. That is, the wireless network needs to be configured so that, say, a wireless on/off switch in a particular office area only controls the light fixtures therein, and does not control additional light fixtures down the hall or in other parts of the building.

Furthermore, the labor associated with locating and grouping devices into functional groups is also substantial, even with accurate floor plans, the labor required to perform these tasks is steep and expensive and because of intensive human involvement, the process is prone to error.

Therefore, what is needed is an apparatus and method for identifying, locating, functionally grouping, and describing a plurality of devices in a wireless network that exhibits a substantial reduction in error over that which has heretofore been provided.

What is also needed is a technique for creating functional groups of devices in a wireless network.

What is furthermore needed is a mechanism for creating functional groups of wireless devices that does not require the wireless devices to be identified and located one at a time.

What is moreover needed is an autonomous system for creating functional groups of wireless devices that does not require the wireless devices to be identified and located one at a time.

What is additionally needed is a system for simultaneously creating and describing functional groups of heretofore unknown wireless devices which can be performed by one or more technicians.

SUMMARY OF THE INVENTION

The present invention, among other applications, is directed to solving the above-noted problems and addresses other problems, disadvantages, and limitations of the prior art by providing a superior technique for easily creating functional lighting groups in buildings.

One aspect of the present invention provides a multimode switch that has a wireless transceiver, a line voltage switch, and a switch controller. The wireless transceiver is configured to transmit and receive messages over a wireless network. The line voltage switch is coupled to a line voltage and to one or more wireless devices. The switch controller, responsive to first messages received over the wireless network, is configured to direct the line voltage switch to provide the line voltage to, and subsequently remove line voltage from, the one or more wireless devices, and is configured to receive first identifying information and functional group designation for the one or more wireless devices in second messages over the wireless network, and is configured to thereafter control the one or more wireless devices according to the identifying information and functional group designation via transmission of third messages over the wireless network.

Another aspect of the present invention contemplates a multimode switch that includes an actuator, a wireless transceiver, a line voltage switch, and a switch controller. The actuator is configured to indicate a state responsive to a change in actuation. The wireless transceiver is configured to transmit and receive messages over a wireless network. The line voltage switch is coupled to a line voltage and to one or more wireless devices. The switch controller is configured to direct the line voltage switch to provide the line voltage to, and subsequently remove line voltage from, the one or more wireless devices, and is configured to receive first identifying information and functional group designation for the one or more wireless devices in second messages over the wireless network, and is configured to thereafter control the one or more wireless devices according to the identifying information and functional group designation and the state via transmission of third messages over the wireless network.

A further aspect of the present invention comprehends multimode switch method, comprising: via a wireless transceiver, transmitting and receiving messages over a wireless network; coupling a line voltage switch to a line voltage and to one or more wireless devices; and via a switch controller, responsive to first messages received over the wireless network, directing the line voltage switch to provide the line voltage to, and subsequently remove line voltage from, the one or more wireless devices; receiving first identifying information and functional group designation for the one or more wireless devices in second messages over the wireless network; and thereafter controlling the one or more wireless devices according to the identifying information and functional group designation via transmission of third messages over the wireless network.

BRIEF DESCRIPTION OF THE DRAWINGS

These and other objects, features, and advantages of the present invention will become better understood with regard to the following description, and accompanying drawings where.

DETAILED DESCRIPTION

Figure 1:
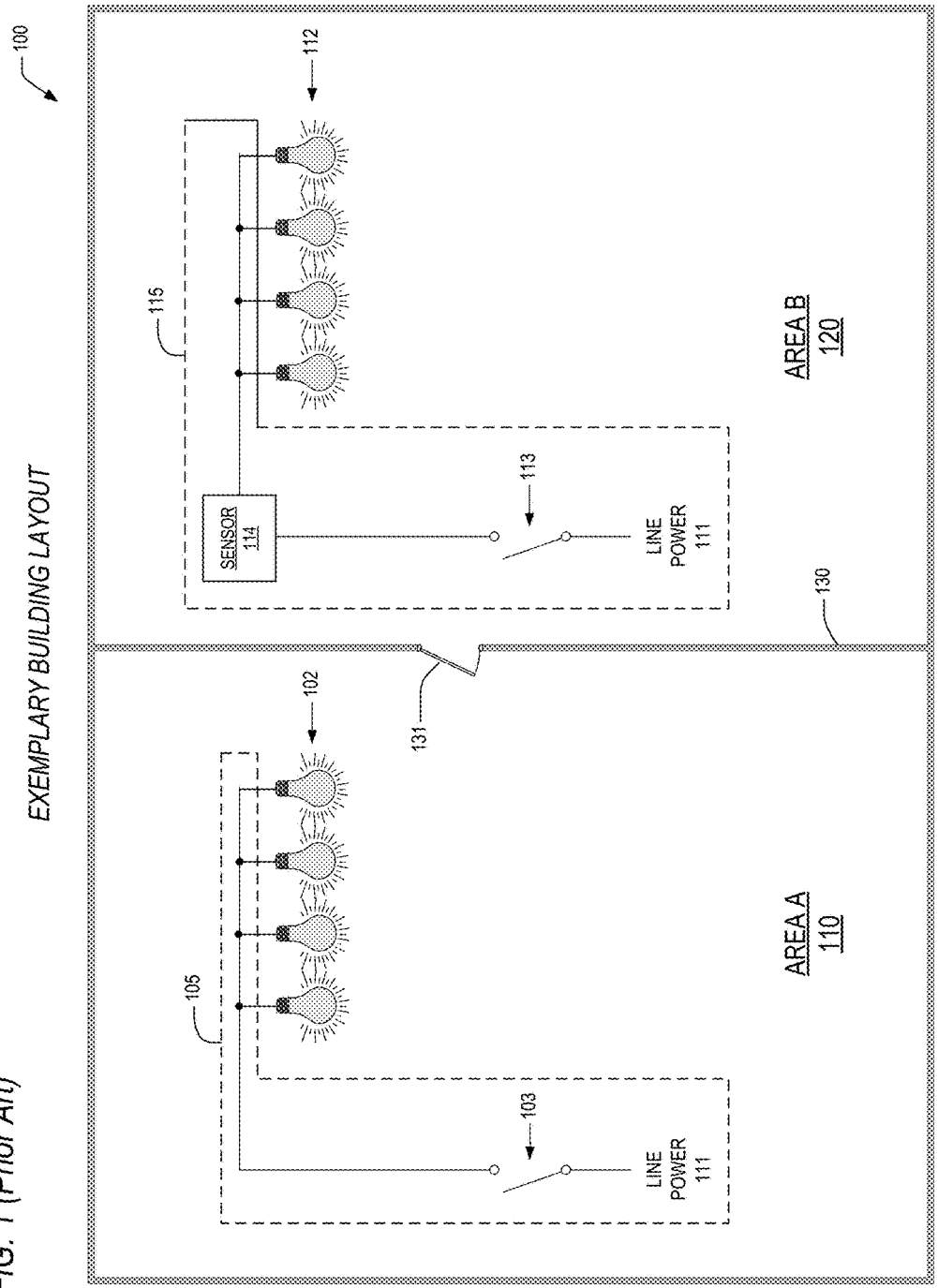
FIG. 1 is a block diagram illustrating an exemplary present day building layout of wired lighting fixtures.

Exemplary and illustrative embodiments of the invention are described below. In the interest of clarity, not all features of an actual implementation are described in this specification, for those skilled in the art will appreciate that in the development of any such actual embodiment, numerous implementation specific decisions are made to achieve specific goals, such as compliance with system-related and business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase.

In view of the above background discussion on building lighting management and associated techniques employed for identifying and grouping related devices in a wireless network configuration, a discussion of the disadvantages and limitations of these techniques will be presented with reference to FIGS. 1. Following this, a discussion of the present invention will be presented with reference to FIGS. 2-4. The present invention overcomes the disadvantages and limitations of present day techniques by providing an apparatus and method for creating functional lighting groups which minimizes configuration error.

Turning to FIG. 1, a block diagram is presented illustrating an exemplary building layout 100 of wired lighting fixtures 102, 112. The building layout 100 includes two areas 110, 120 separated by a wall 130 having a door 131 disposed therein. Such is exemplary of many present day buildings. Area A 110 has a plurality of light fixtures 102 powered by a common circuit 105. Line power 111 is applied to the common circuit 105 through a wired switch 103 within Area A 110. Likewise, Area B 120 has a plurality of light fixtures 112 powered by a common circuit 115. Line power 111 is applied to Area B's common circuit 115 through a wired switch 113 within Area B 120 and wired lighting dynamically controlled by a sensor 114, such as, but not limited to, an occupancy sensor, daylight harvester, etc.

A building or structure, such as is exemplified in the building layout 100, may be segregated into physical areas and logical areas (also referred to herein as a "logical group" or "functional group"). The physical areas are depicted in FIG. 1 as Area A 110 and Area B 120, which are physically separate, as in indicated by the wall 130. The areas 110, 120 may consist of individual office spaces having only one logical area (i.e., an area where light fixtures 102, 112 (also referred to herein as "luminaires") therein are controlled by corresponding switches 103, 113 and sensors 114). Alternatively, a given physical area 110, 120 may comprise a plurality of logical areas. Furthermore, a logical area may span a plurality of physical areas. A physical area 110, 120 may have one or more sensors 114 that are employed to modify the light output of such groups 102, 112, such as sensor 114 is depicted for control of the plurality of light fixtures (also referred to herein as "luminaire group") 112 in Area B 120. In both areas 110, 120, each of the luminaire groups 102, 112 are controlled and powered via common circuits (or, "infrastructure") 105, 115 that supply power and control to the groups of luminaires 102, 112. Switch 103 controls the luminaire group 102 in Area A 110, and both switch 113 and the sensor 114 control the luminaire group 112 in Area B 120.

As is alluded to above, a building owner/occupier may opt to replace/upgrade their present wired lighting configuration, such as is shown in the exemplary building layout 100 of FIG. 1, with an energy efficient and controllable configuration, where light fixtures, sensors, and controls are upgraded to include wireless networking capabilities. And the present inventors have observed that when a present day wireless network is created, identifying information (e.g., network ID, MAC ID, EUI 64, etc.) of corresponding physical devices, their locations relative to each other, and how subsets of these physical devices are functionally grouped together cannot be easily nor economically determined. As one skilled in the art will appreciate, while absolute locations (e.g., their GPS coordinates) of these devices may be desired, in order to configure the network of devices for proper operation, determination of the devices' relative locations and functional groupings is mandatory.

Present day techniques for identifying, locating, and grouping devices typically require that unknown devices be identified and located serially, namely, one device at a time. In other words, a first device is revealed, and its identification and location are recorded, typically on a floor plan or building notation log (e.g., "fluorescent lamp fixture, MAC ID XXX, $2^{nd}$ floor conference room northern end"). Then, a second device is revealed, identified, located, and recorded. This serial process continues, until a last device has been identified, located, and recorded.

Many different techniques are employed to reveal devices in order to determine their identities and relative locations. Depending upon device type within the wireless network, these techniques may include, but are not limited to, shining lights, scanning bar codes, pushing buttons, power cycling, emitting sounds, etc. Once all of the devices have been identified and located, then subsets of the devices are placed into functional working groups. In many present day configurations, this placement is achieved via some form of computer interface through which an operator interprets the floor plan or building notation log in order to create each of the functional working groups. Grouping creates sets of devices that act logically as one subsystem.

For instance, in the case of a retrofitted building full of light fixtures, a given office area, like Area A 100 or Area B 120 of FIG. 1, may have four wireless-enabled light fixtures, two wireless occupancy sensors, and one wireless on/off switch. The switch and sensors operate to exclusively control the light fixtures within the given office area. That is, switches and sensors in other areas of the building do not control the fixtures in the given office area, nor do the sensors and switch within the given office area operate to control light fixtures in other areas of the building. Thus, the four light fixtures, the switch, and the sensors form a logical (or, "functional") group within the given office area.

When converting a system of wired devices into a controllable network of wireless devices, the process described above must be accomplished so that wireless controls and wireless sensors throughout the building are configured to interoperate within their corresponding functional groups in substantially the same manner as their wired controls and sensors that are being replaced. That is, the wireless network needs to be configured so that, say, a wireless on/off switch in a particular office area only controls the light fixtures within its logical group, and does not control additional light fixtures down the hall or in other parts of the building that belong to other logical groups.

The present inventors have noted that present day techniques for identifying, locating, and recording devices is disadvantageous at best since only one device at a time can be processed. In order to identify, locate, and record a plurality of devices, each device must be processed in a serial manner, that is, one device after another. Consequently, extensive time and labor are required to identify and group a network that includes the plurality of devices, which is quite costly from an installation perspective. If a particular process requires human intervention (e.g., to read a label, scan a bar code, shine a light, or push a button), then the probability of human error is increased along with the labor cost to remedy errors that are thereby introduced. In addition, the action of reading a label, scanning a bar code, shining a light, or pushing a button may be prohibitively expensive and time consuming. Consider the labor associated with accessing ceiling mounted devices to push a button, or accessing devices that have transducers, electronics, or labels that are internal to the devices. In some cases, the devices may require disassembly in order to reveal the transducers, electronics, or labels. In a building consisting of hundreds of light fixtures, the costs associated with this process are substantial.

Furthermore, the present inventors have noted that the labor associated with locating and grouping devices into functional groups is also substantial, for even with accurate floor plans, the labor required to perform these tasks is steep. Without accurate floor plans, the location and notation steps are additionally prone to imprecision, for present day techniques rely predominantly on human interpretation of the user interface and upon human technicians to derive the proper functional working groups.

U.S. Pat. No. 9,560,727 discloses an apparatus and method for creating function wireless lighting groups, which employs legacy line voltage switches to create the functional wireless lighting groups. When placed in a commissioning and grouping mode by a controller device, wireless light fixtures are configured to indicate to the controller device via wireless messages when they are power cycled. Accordingly, as a technician cycles power to first wireless light fixtures via a corresponding legacy line voltage switch, the wireless light fixtures indicate to the controller device that they have been power cycled, and the controller device designates all the first wireless lighting fixtures as being part of a first functional group. The technician moves on to a second legacy line voltage switch, toggles power to second wireless light fixtures, and the second wireless light fixtures are assigned to a second function group. And so on.

After all the legacy line voltage switches have been power cycles and all functional groups designated, the legacy line voltage switches must be replaced by wireless switches for each of the functional groups. The wireless switches are each commissioned onto the network and then are associated via the controlling device with their corresponding functional lighting group.

The present inventors have observed that the apparatus and method disclosed in the above-noted U.S. Patent is limiting in that multiple steps are required to retrofit a building with wireless lighting fixtures, controls, and sensors. First, all the buildings light fixtures must be replaced with wireless light fixtures, leaving all the legacy line voltage switches in place. Next, the wireless light fixtures are commissioned onto the network and their functional groups are identified and assigned, as described above. Next, the legacy line voltage switches are replaced with wireless switches, and the wireless switches are associated with their corresponding functional lighting group. It is noted that to replace the legacy line voltage switches with wireless switches requires that line power to shut off, as is required to retrofit the legacy lighting fixtures with the wireless lighting fixture. Consequently, an electrician must be available both before and after creation of the functional lighting groups. And as one skilled in the art will appreciate, there may be a substantial time gap in-between while a technician (not an electrician) executes the functional light grouping steps, which results in unnecessary expense and inefficiency.

The present invention overcomes the above-noted disadvantages and limitations, and others, by utilizing a novel multimode wireless switch, as will be described in further detail below, which is configured to operate as a legacy line voltage switch, and/or a wireless lighting fixture switch. The multimode wireless switches according to the present invention are retrofitted into the building in place of the legacy line voltage switches at the same time as the legacy light fixtures are retrofitted with wireless lighting fixtures.

The multimode wireless switches are configured to enter a legacy line voltage switch mode prior to entering a commissioning mode, thus enabling the wireless light fixtures to be controlled manually as with a legacy line voltage switch until a technician is scheduled to commission the wireless light fixtures and create functional lighting groups. The multimode wireless switches are moreover configured to enter one of two commissioning modes when so directed by a commissioning device: an autonomous commissioning mode or a commission and describe mode. In an autonomous commissioning mode, each multimode wireless switch in a facility identifies itself to the commissioning device and, upon direction from the controlling device, cycles power to its corresponding wireless light fixtures (which have also been placed into a commissioning mode). The wireless light fixtures respond to the controlling device that they have been power cycled, and the controlling device creates a functional lighting group that includes both the fixtures, connected sensors, and their corresponding multimode wireless switch. As each functional lighting group is created, the controller then places the corresponding multimode wireless switch into a wireless operation, mode, whereby the corresponding multimode wireless switch no longer switches line voltage, but rather sends wireless commands to control each of its associated wireless lighting fixtures and sensors within its functional lighting group. Advantageously, by utilizing multimode wireless switches according to the present invention, an electrician is only required once to retrofit the entire building with wireless light fixtures, sensors, and multimode switches. Following this, a technician may be scheduled to perform the autonomous commissioning and functional grouping step, or the autonomous commissioning and functional grouping step may be performed remotely over the internet or other communication channel via known techniques.

For the commission and describe mode, the building is first retrofitted with wireless light fixtures, sensors, and multimode switches according to the present invention. Via the commissioning device, a technician may subsequently place the system in the commission and describe mode, where the multimode wireless switch is configured to switch line voltage to its corresponding wireless fixtures upon mechanical actuation by the technician, while simultaneously providing unique identifying information to the controller device. When the technician mechanically actuates the multimode wireless switch, the multimode wireless switch sends a wireless message to the commissioning device indicating that it is to be placed in a functional group with the corresponding light fixtures and connected sensors. In addition, the multimode wireless switch switches line voltage to the corresponding wireless light fixtures. Upon cycling of the line voltage, the corresponding wireless lighting fixtures respond to the commissioning device, and the commissioning device creates a functional lighting group comprising the corresponding wireless lighting fixtures, connected sensors, and the multimode wireless switch. The technician then enters descriptive information that is associated with the newly created functional lighting group, such as "$5^{th}$ Floor, Southwest Corner Office," "$10^{th}$ Floor Men's Restroom," "Executive Conference Room," etc. After the descriptive information is entered, either directly into the commissioning device or by remote communication mechanisms, the commissioning device then directs the multimode wireless switch to enter into the wireless switch mode, as is described above. The present invention will now be discussed with reference to FIGS. 2-4.

Figure 2:
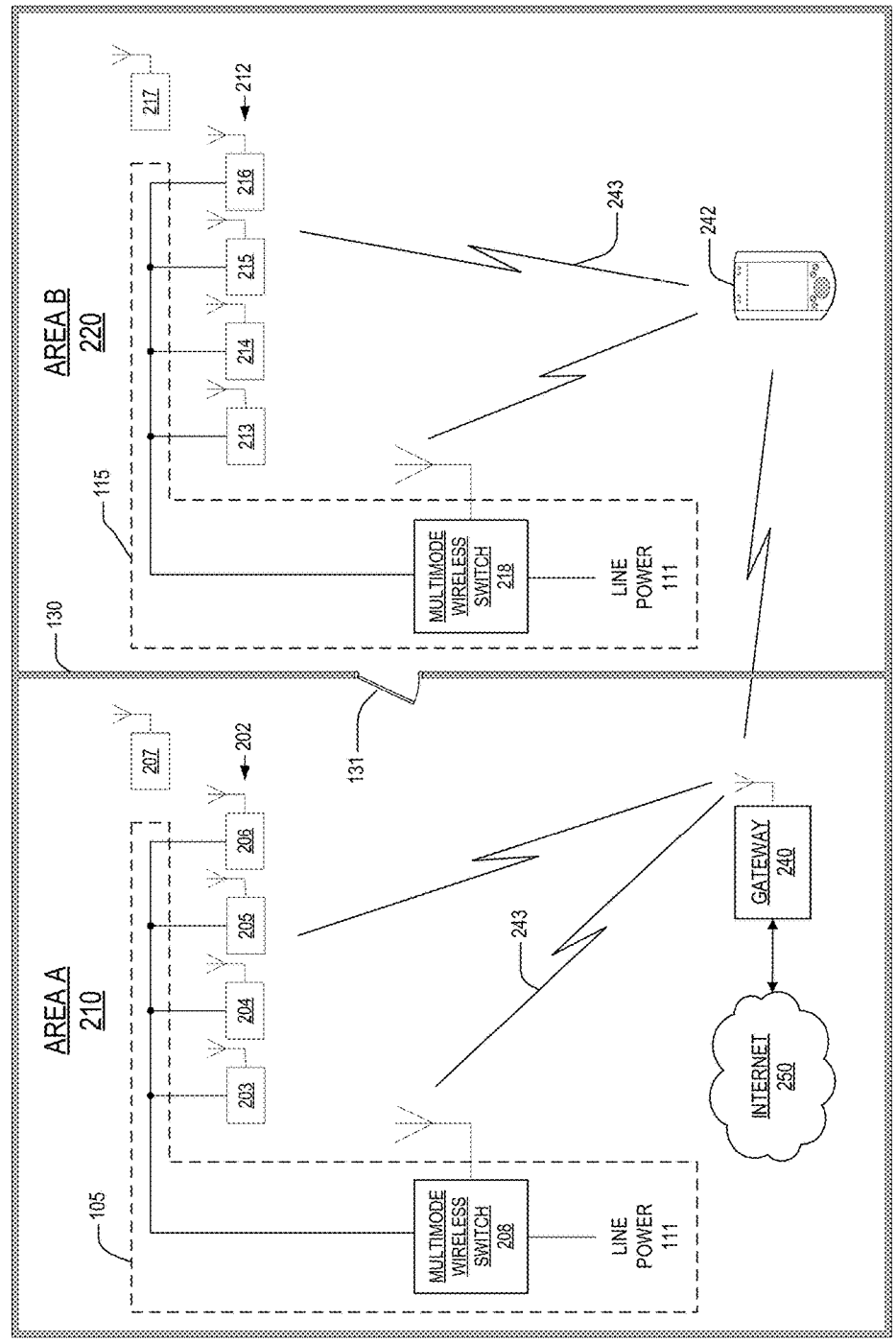
FIG. 2 is a block diagram depicting an autonomous system for commissioning and harvesting functional groups of wireless devices.

Referring to FIG. 2, a block diagram is presented depicting an apparatus according to the present invention for creating functional wireless lighting groups. The diagram shows an exemplary upgraded building layout 200, very much like the building layout 100 of FIG. 1. The building layout 200 includes two areas 210, 220 separated by a wall 130 having a door 131 disposed therein. Area A 210 has a plurality of wireless light fixtures 203-206 which replaces a corresponding plurality of wired light fixtures (not shown), and which are powered by a common circuit 105, formerly used to power the wired light fixtures. Line power 111 is applied to the common circuit 105 through multimode wireless switch 208 operating in legacy switch mode as described above within Area A 210. Accordingly, the light fixtures 203-206 are intended to form a logical group 202. Area A 210 also includes a wireless sensor 207, such as, but not limited to, a wireless occupancy sensor, a wireless daylight harvester, etc. Likewise, Area B 220 has a plurality of light fixtures 213-216 which replaces a corresponding plurality of wired light fixtures (not shown), and which are powered by a common circuit 115, formerly used to power the wired light fixtures. Line power 111 is applied to Area B's common circuit 115 through a multimode wireless switch 218 operating in legacy switch mode within Area B 220. Accordingly, the light fixtures 213-216 are intended to form a logical group 212. Area B 220 also includes a wireless sensor 217, such as, but not limited to, a wireless occupancy sensor, a wireless daylight harvester, etc. The multimode wireless switches 208, 218 and wireless sensors 207, 217 are intended for control and/or management of the wireless luminaires 203-206, 213-216 within their respective logical groups 202, 212.

Like the building layout 100 of FIG. 1, the layout 200 according to the present invention may be segregated into physical areas 210, 220 and functional groups. The physical areas are depicted in FIG. 2 as Area A 210 and Area B 220, which are physically separate, as in indicated by the wall 130. The physical areas 210, 120 may consist of individual office spaces having only one logical area. Alternatively, a given physical area 210, 220 may comprise a plurality of logical areas. Furthermore, a logical area may span a plurality of physical areas 210, 220. A physical area 210, 220 may have one or more multimode wireless switches 208, 218 and wireless sensors 207, 217 that are employed to modify the light output of wireless luminaire groups 202, 212. In both areas 210, 220, when the multimode wireless switches 208, 218 operate in the legacy switch (default) mode, each of the wireless luminaire groups 202, 112 are controlled and powered via existing infrastructure 105, 115 that supplies power and control to the groups of luminaires 202, 212, and that formerly supplied power to wired light fixtures replaced in the upgrade. Switch 208 controls power to luminaire group 202 in Area A 210 when mechanically actuated, and switch 218 controls power to luminaire group 212 in Area B 220 when mechanically actuated.

Once commissioned onto the network, wireless switch 208 and wireless sensor 207 are intended to control lighting in group 202 via wireless commands. Wireless switch 218 and wireless sensor 217 are intended to control lighting in group 212 via wireless commands. Control of lighting may include, but is not limited to, on/off, luminous intensity level, color, and special effects (e.g., strobe, flash frequency, etc.). Light sources within the wireless lighting fixtures 203-206, 213-216 may include, but are not limited to, fluorescent bulbs, light-emitting diodes, and other sources of controllable light in both the visible and infrared spectrums.

The layout 200 also includes a gateway device 240 that is coupled to the internet 250 (or other wide area network). The gateway device 240 may provide for wireless interconnectivity of the wireless lighting fixtures 203-206, 213-216, the wireless switches 208, 218, the wireless sensors 207, 217, and a wireless commissioning device 242. The gateway 240 provides for wireless interoperability between the wireless devices 203-208, 213-218, the commissioning device 242, and the gateway 240 itself by configuring a wireless network consisting of a plurality of wireless links 243 over which the devices 203-208, 213-218, the commissioning device 242, and the gateway 240 communicate. The wireless network enables communication and control of devices 203-208, 213-218 and on an individual and/or group basis, by both the commissioning device 242 and the gateway 240.

For purposes of the present application, the term "gateway" 240 will be employed to mean all the devices and software (e.g., access points, Internet gateways, coordinators, etc.) that are required to provide for communication with all the wireless devices 203-208, 213-218, as well as communication via the Internet cloud 250, cellular network (not shown) or other form of wide area network (not shown), such as is required for communication and cloud based management and control.

In one embodiment, the gateway 240 and commissioning device 242 are separate devices. In another embodiment, the gateway 240 and commissioning device 242 combined into a single device such as, but not limited to, a smartphone (e.g., IPHONE®, ANDROID® phone), a tablet computer (e.g., IPAD®, etc.), or a wirelessly enabled laptop computer.

Advantageously, the present invention employs a coordinated exploitation of the existing infrastructure 105, 115 for a legacy wired system of devices (not shown) to enable identification, locating, and recording of functional groups of corresponding wireless devices 203-208, 213-218 in a manner that is superior to that which has heretofore been provided. The commissioning device 242 may communicate with the internet 250 directly and may access a cloud-based server (not shown) for wireless network configuration support. Alternatively, the commissioning device 242 may communicate with the gateway 240 directly and the gateway may communicate with the internet 250. The commissioning device 242 may be employed by a technician to control the wireless devices 203-208, 213-218 and the gateway 240.

In operation, all the wireless luminaires 203-206, 213-216 and sensors 207, 217 are physically installed and powered up. As the multimode wireless switches 208, 218 initialize in the legacy switch mode, power switching of the legacy power lines is provided for by mechanical actuation of the multimode wireless switches 208, 218. Though the wireless luminaires 203-206, 213-216, sensors 207, 217, and multimode wireless switches 208, 218 are not yet commissioned within a wireless network, they are however powered on and are communicating over the wireless network over the links 243 as the wireless network executes a discovery phase.

Thus, all wireless devices 203-208, 213-218, 240, 242 are communicating on the wireless network over the links 243, but the locations and groupings of the luminaires 203-206, 213-216, sensors 207, 217, and multimode wireless switches 208, 218 are unknown. For clarity sake, only a small number of luminaires 203-206, 213-216 and sensors 207, 217 are shown in the layout 200, however, one skilled in the art will appreciate that a typical building under which the present invention may be practiced may comprise hundreds of luminaires, multimode switches, and sensors divided into a functional lighting groups according to building lighting requirements.

A key feature of the present invention is that the switch legs of the existing infrastructure 105, 115 are employed to reveal both the identity and functional grouping of the luminaires 203-206, 213-216. This is because the multimode wireless switches 208, 218 are already wired to, and grouped with, their corresponding luminaires 203-206, 213-216 via the existing infrastructure 105, 115. Thus, the present invention contemplates utilization of legacy line voltage switching via the multimode wireless switches 208, 218 to identify and commission their respective luminaires 203-206, 213-216 and connected sensors 207, 217, and to assign the wireless devices 203-208, 213-218 to functional groups. After functional grouping is complete, the multimode wireless switches 208, 218 are commanded to enter the wireless operating mode, as described above, whereby their respective luminaires 203-206, 213-216 are controlled and managed via wireless commands over the network. A connected sensor 207, 217 is one which may be powered by or controlled by the luminaires 203-206, 213-216 themselves, or which is integral to the luminaires 203-206, 213-216. Sensors 207, 217 that are not connected are those which must be commissioned and functionally grouped apart from commissioning and harvesting of the luminaires 203-206, 213-216.

The commissioning device 242 may comprise one or more application programs executing thereon, dedicated circuitry, or a combination of application programs and dedicated circuitry to communicate with the gateway 240 and to command the wireless devices 203-208, 213-218 to enter the commissioning/functional grouping mode. The wireless devices 203-208, 213-218 and the gateway 240 may comprise one or more application programs executing thereon, dedicated circuitry, or a combination of application programs and dedicated circuitry to communicate with the gateway 240 and to perform commissioning/functional grouping mode functions as will be described below.

In one embodiment, a technician may execute a function on the handheld device 242, or may remotely (via the internet 250) inform the gateway 240 to enter the autonomous mode. In response, the gateway 240 will command the wireless devices 203-208, 213-218 to enter the autonomous mode. Each multimode wireless switch 208, 218 in the facility is known during discovery phase during formation of the wireless network. In the autonomous mode, a first multimode wireless switch 208, 218 in the facility is selected, either by the technician via 242 or randomly selected via an application program executing either on the gateway device 240 (or on an offsite server (not shown) accessed via the internet 250). Next, the first wireless switch 208, 218 is directed via a wireless message to cycle line voltage to its corresponding wireless light fixtures 203-206, 213-216 (which have also been placed into a commissioning mode). The wireless light fixtures 203-206, 213-216 respond to the controlling device 242 that they have been power cycled, and the controlling device 242 creates a functional lighting group that includes both the fixtures 203-206, 213-216, connected sensors 207, 217, and their corresponding multimode wireless switch 208, 218. As each functional lighting group is created, the commissioning device 242 then places the corresponding multimode wireless switch 242 into a wireless operation mode, whereby the corresponding multimode wireless switch 208, 218 no longer switches line voltage, but rather sends wireless commands to control each of its associated wireless lighting fixtures 203-206, 213-216 within its functional lighting group. After the first wireless switch 208, 218, connected sensors 207, 217, and corresponding wireless light fixtures 203-206, 213-216 have been functionally grouped and placed into the wireless operation mode, a next wireless switch 208, 218 is selected for functional grouping. And so on, until all the wireless switches 208, 218 have been functionally grouped. As is noted above, the autonomous commissioning and functional grouping step may be performed remotely over the internet 250 or other communication channel via known techniques.

In a commission and describe embodiment, a technician may enter one of the areas 210, 220 and may instruct the gateway 240 via the handheld device 242 that a new functional group is to be formed. Consider that the technician entered Area A 210. The technician will then cycle the line voltage power 111 by mechanically actuating multimode wireless switch 208. All wireless luminaires 203-206 that are wired to the legacy switch leg through the multimode wireless switch 208 will have their power turned off and then back on. On power up, the wireless luminaires 203-206 will function normally. Additionally, since the luminaires 203-206 and the multimode wireless switch 208 are in commission and describe mode, the luminaires 203-206 will notify the gateway 240 that they have been powered cycled while in this mode via respective messages transmitted over the links 243. The gateway 240 will thus record these luminaires 203-206 as a newly formed group 202 which is associated with multimode wireless switch 208 and sensor 207 (if connected), including all corresponding identifying information (e.g., MAC address, manufacturer, device type, version, etc.). Following formation of the new group 202, the technician may then enter descriptive information that is associated with the newly created functional lighting group 202, such as "5$^{th}$ Floor, Southwest Corner Office," "10$^{th}$ Floor Men's Restroom," "Executive Conference Room," etc. After the descriptive information is entered, either directly into the commissioning device 242 or by remote communication mechanisms, the commissioning device 242 then directs the multimode wireless switch 208 to enter into the wireless switch mode, as is described above.

Continuing formation of the functional group, the technician then activates a commissioning control (e.g., push button, toggle switch, etc.) on any unconnected sensors 207 that are to be employed for additional control of luminaires 203-206 within the group 202, which will inform the gateway 240 that the wireless sensors 207 has had a commissioning control activated while in grouping mode, and the gateway 240 will thus associate these unconnected wireless sensors 207 with the newly created group 202 to allow for additional control of the luminaires 203-206. Once all the devices 203-208 are grouped, the technician then instructs the gateway 240 that association of devices 203-208 within the group 202 is complete.

The technician may then move on to the next area 220 and will follow the same procedure described above to form a next functional group 212 comprising grouped luminaires 213-216, connected and unconnected sensors 217, and wireless switch 218.

One advantage of the present invention is that the gateway 240 may autonomously commission and harvest functional groupings for retrofitted lighting or, in the commission and describe mode, the technician may commission and harvest groupings of the wireless devices 203-208, 213-218 in any order of functional groups. That is, devices 203-208 may be commissioned and harvested before or after commissioning and harvesting devices 213-218.

The present invention also contemplates the use of multiple commissioning devices 242 by multiple technicians working in the same building at the same time to create functional groups simultaneously. To enable this feature, the gateway 240 will employ time stamp, time series, and/or time delta analyses on messages received in order to properly bin detected events and groups. In addition, or alternatively, the commissioning devices 242 can communicate and coordinate with each other in order to facilitate orderly grouping of events.

Having determined the devices' relative locations and functional groupings, and thereby configuring the network of devices for proper operation, the present invention additionally enables more fine-grained identification and location of individual devices 203-208, 213-218, if desired. Because groups of devices 203-208, 213-218 within a building are inherently smaller in number and more manageable than the set of all devices in the building, coordinated operations such as flashing a luminaire within a specific group and noting its relative physical location within the group on a user interface are enabled. This notation may include the use of captured images of a ceiling grid along with luminaires 203-206, 213-216 and sensors 207, 217 disposed therein in order to enhance the relative and absolute location device metadata. In one embodiment, the functions for such fine-grained identification and location may be disposed within applications programs within the commissioning device 242.

Although the devices 203-208, 213-218 according to the present invention are described above as having dedicated hardware/software disposed therein to enable them to enter and perform functions associated with the functional grouping mode, other embodiments are contemplated as well. For example, certain wireless networks configurations may be configured to send information back to the gateway 240 when stimulated (e.g., a button has been pushed, a device is powering up, toggled, etc.). Accordingly, the gateway 240 for such embodiments may be configured to uniquely interpret these communications in order to identify and group the devices 203-208, 213-218.

Figure 3:
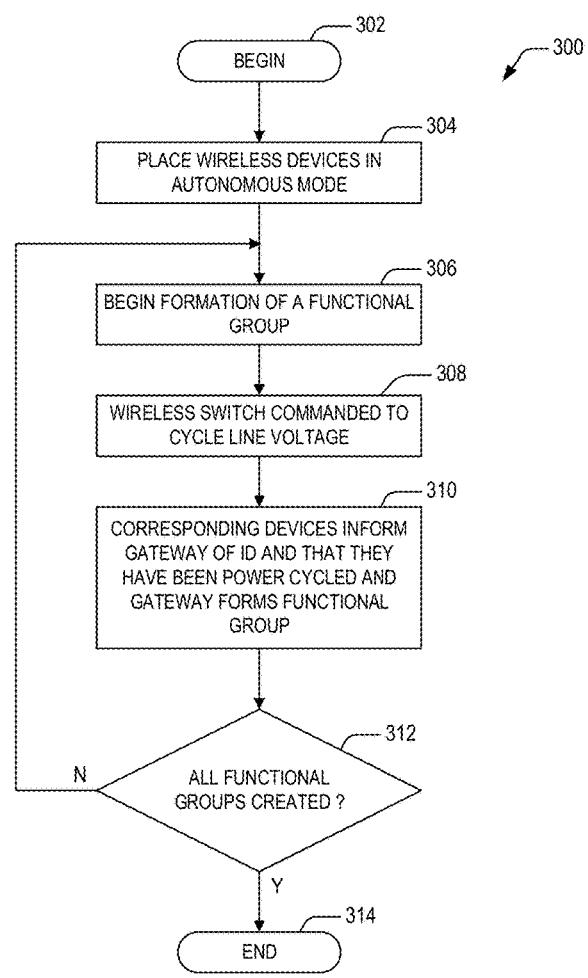
FIG. 3 is a flow diagram featuring a method according to the present invention for autonomously commissioning and harvesting functional groups of wireless devices.

Referring to FIG. 3, a flow diagram 300 is presented of a method for autonomously creating functional lighting groups according to the present invention.

Flow begins at block 302 where a building that had been retrofitted with wireless luminaires, multimode wireless switches, and sensors is in powered up state. In addition, a wireless network has been formed and all wireless devices 203-208, 213-218 have been identified during discovery phase of the wireless network. Such identification includes, but is not limited to, unique identifier (e.g., MAC address, etc.) and device type (e.g., switch type, light type and capabilities, sensor type and capabilities, etc.). Flow then proceeds to block 304.

At block 304, all the wireless devices are placed into an autonomous commissioning and functional group harvesting mode via gateway and commissioning device messages over a wireless network. Flow then proceeds to block 306.

At block 306, formation of a new functional group is initiated via commands implemented over a commissioning device. Flow then proceeds to block 308.

At block 308, a wireless switch is commanded via the commissioning device over the wireless network to cycle legacy line voltage to its corresponding wireless luminaires. Flow then proceeds to block 310.

At block 310, wireless luminaires that have been power cycled via the action in block 308 inform the gateway of their identifying information and that they have been power cycled while in autonomous mode. The gateway then groups the power cycled wireless devices, connected sensors, and wireless switch into the new functional group. Flow then proceeds to block 312.

At decision block 312, an evaluation is made to determine if all functional groups within the building have been created. If not, then flow proceeds to block 306. If so, then flow proceeds to block 314.

At block 318, the method completes, allowing commissioning of unconnected wireless sensors within the building.

One advantage of present invention is that it may be employed to efficiently derive functional lighting groups from existing infrastructure, thus eliminating the need to rely upon serial processes and human interpretation, thereby minimizing mistakes and saving time and labor. Devices can be identified and a functional wireless network of the devices can be created with labor that has minimal training and knowledge of networks.

Another advantage of the present invention is that multiple devices can be identified and grouped simultaneously in a robust and reliable manner.

The gateway according to the present invention logically groups specific physical wireless devices together to function as one or more functional lighting groups. Via one or more commissioning devices, technicians may record the relative location of the functional lighting group (and thereby of the individual devices)—with or without the aid of an existing floor plan. These relative locations may be determined after autonomous commissioning and harvesting, or they may be entered as part of the commission and describe mode of system operation. For example, functional lighting groups are typically associated with well-known landmarks such as "CEO Office" or "$2^{nd}$ Floor Conference Room North." Accordingly, it is noted that the present invention creates highly accurate functional lighting groups by deriving those groups from existing infrastructure. Thus, the process of functional grouping does not rely nor depend on the absolute accuracy of geo-location for each of the devices in the network. This is a substantial improvement over present day identification, location, and recording mechanisms, which are particularly frail because they are highly dependent upon device location information to create a functional group.

Figure 4:
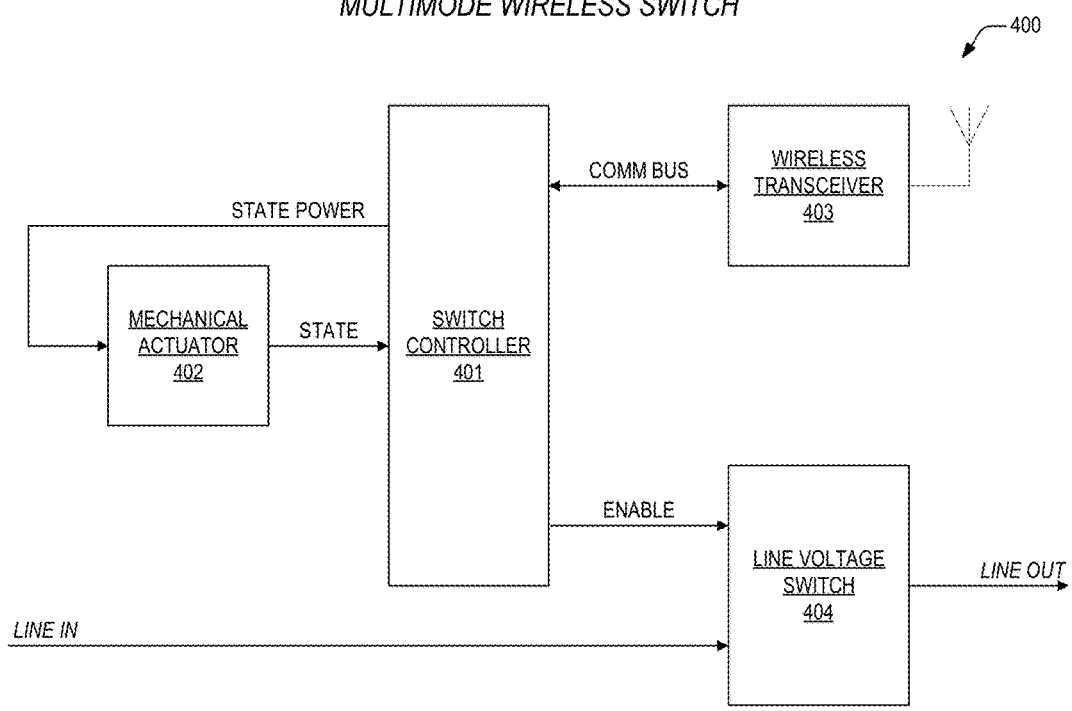
FIG. 4 is a block diagram highlighting a multimode wireless switch according to the present invention.

Now turning to FIG. 4, a block diagram is presented of a multimode wireless switch 400 according to the present invention. The switch 400 may be employed in any of the embodiments discussed above with reference to FIGS. 2-3. The switch 400 includes a switch controller 401 that is coupled to a mechanical actuator 402 via a STATE POWER bus and a STATE bus. The switch controller 401 is also coupled to a wireless transceiver 403 via a COMM bus. The switch controller 401 is further coupled to a line voltage switch 404 via an ENABLE bus. The line voltage switch 404 receives a line voltage such as line power 111 in FIG. 2 over bus LINE IN and provides switching of the line voltage to a load side, for powering of associated wireless luminaires (not shown) via bus LINE OUT. The line voltage switch 404 may comprise electrical elements (e.g., semiconductor switches, etc.), mechanical elements (e.g., levers, actuators, etc.), or electromechanical elements (e.g., relays, solenoids, etc.).

In operation, the switch controller 401 is configured to transmit and receive wireless messages over a wireless network 243 according to a wireless protocol (e.g., Wi-Fi, IEEE 802.11, IEEE 802.15.4, ZIGBEE®, Z-WAVE®, BLUETOOTH®, etc.) chosen for the embodiment. The messages may be between the switch 400 and a gateway 240, between the switch 400 and a commissioning device 242, or between the switch 400 and the associated wireless luminaires. In one embodiment, control (e.g., ON, OFF, dimming, light color, etc.) of the associated wireless luminaires is provided for by wireless messages generated by the gateway 240. In another embodiment, control of the associated wireless luminaires is provided for by wireless messages generated by the switch 400 operating under wireless operating rules provided by the gateway 240. In yet another embodiment, control of the associated wireless luminaires is provided for by wireless messages generated by both the switch 400 and the gateway 240. Accordingly, in a wireless operating mode, the switch controller 401 may assert STATE POWER and then sense the state (e.g., open or closed, level of dimming selected, light color, etc.) of the actuator 402 over bus STATE. According to chosen embodiment, the switch controller 401 may either transmit messages to the gateway 240 indicating state of the actuator 402, or may transmit control messages to the associated wireless luminaires to control their operation. In all modes of operation, when state of the mechanical actuator 402 is changed (e.g., toggled, pressed, different knob position, etc.), the switch controller 401 is configured to transmit messages over the network, via the wireless transceiver 403, indicating state change.

The mechanical actuator 402 may comprise any well-known elements of a present day light switch, dimmer, or selector knob, with additional elements (if required) to couple to STATE POWER and STATE.

In a legacy line voltage switch mode, the switch controller 401 may be configured to direct the line voltage switch 404 to provide line voltage to the associated wireless luminaires over LINE OUT. When ENABLE is not asserted, the line voltage switch 404 does not provide line voltage to the associated wireless luminaires. When ENABLE is asserted, the line voltage switch 404 provides line voltage to the associated wireless luminaires. In this mode, the switch controller 401 may sense the state of the mechanical actuator 402 via STATE and may assert ENABLE when STATE indicates that the actuator 402 is in an "ON" state, and may not assert ENABLE when STATE indicates that the actuator 402 is in an "OFF" state. The multimode wireless switch 400 may also be configured to enter the legacy line voltage switch mode as a default mode prior to being commissioned onto the wireless network, thus advantageously allowing for control of its associated wireless luminaires via sensing state of the actuator 402.

When placed in either the autonomous mode or the commission and describe mode, the switch controller 401 will assert ENABLE, thus powering on its associated luminaires to allow for discovery and commissioning. While in these two modes, the multimode wireless switch 400 will not function as a legacy line voltage switch and will only switch line voltage to the associated luminaires when directed to do so by the commissioning devices 240, 242. In autonomous mode, the switch 400 is directed to switch line voltage via wireless message. In commission and describe mode, the switch 400 is directed via wireless message to enable legacy line voltage switching responsive to actuation of the mechanical actuator 402.

The switch controller 401 may be further configured to broadcast identifying information (e.g., unique network ID, device function, switch type, etc.) for capture by the commissioning device 242 (or gateway 240), or may be configured to begin broadcasting the identifying information responsive to broadcasted commissioning messages received from the commissioning device 242 (or gateway 240).

Upon receipt of a message directing that the switch 400 perform autonomous harvesting of its associated wireless luminaires, the controller 401 may be configured to de-assert ENABLE for a prescribed time period, and then assert ENABLE, thus removing line voltage from the associated wireless luminaires for the prescribed time period, whereby the associated wireless luminaires transmit wireless messages to the commissioning device 242 (or gateway 240) indicating they have been power cycled. Accordingly, the system may then create a functional lighting group comprising the switch 400 and associated wireless luminaires. Following this, the switch 400 may be also configured to receive identifying information and functional group designation for all of the associated wireless luminaires. Thereafter, the controller 401 may de-assert ENABLE and may subsequently control one or more of the associated wireless luminaires via wireless messages using the identifying information corresponding to the one or more of the associated wireless luminaires.

Upon receipt of a message directing that the switch 400 perform commission and describe harvesting of its associated wireless luminaires, the controller 401 may be configured to de-assert ENABLE and then monitor STATE to detect when a technician toggles the mechanical actuator 402. The controller 401 may then assert/de-assert ENABLE according to the state of the actuator 402 until the switch 400 receives wireless messages from the commissioning device 242 (or gateway 240) providing identifying information and functional group designation for all the associated wireless luminaires. Thereafter, the controller 401 may de-assert ENABLE and may subsequently control one or more of the associated wireless luminaires via wireless messages using the identifying information corresponding to the one or more of the associated wireless luminaires.

The multimode wireless switch 400 according to the present invention is configured to perform the functions and operations as discussed above. The multimode wireless switch 400 may comprise logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the multimode wireless switch 400 may be shared with other circuits, microcode, etc., that are employed to perform other functions and/or operations within multimode wireless switch 400. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor, complex instructions are translated by elements within the CISC microprocessor into associated micro instructions, and the associated micro instructions are directly executed by a unit or units within the CISC microprocessor.

The embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. A multimode switch, comprising:
 a wireless transceiver, configured to transmit and receive messages over a wireless network;
 a line voltage switch, coupled to a line voltage and to one or more wireless devices; and
 a switch controller, responsive to first messages received over said wireless network, configured to direct said line voltage switch to provide said line voltage to, and subsequently remove line voltage from, said one or more wireless devices, and configured to receive first identifying information and functional group designation for said one or more wireless devices in second messages over said wireless network, and configured to thereafter control said one or more wireless devices according to said identifying information and functional group designation via transmission of third messages over said wireless network.

2. The multimode switch as recited in claim 1, wherein said switch controller directs said line voltage switch to provide said line voltage to, and subsequently remove line voltage from, said one or more wireless devices to allow for discovery and commissioning of said one or more wireless devices.

3. The multimode switch as recited in claim 1, wherein said switch controller is configured to transmit second identifying information for capture by a commissioning device.

4. The multimode switch as recited in claim 1, wherein said one or more wireless devices comprise one or more wireless lighting fixtures.

5. The multimode switch as recited in claim 4, wherein said one or more wireless lighting fixtures comprise wireless fluorescent lights.

6. The multimode switch as recited in claim 4, wherein said one or more wireless lighting fixtures comprise wireless light-emitting diode lights.

7. The multimode switch as recited in claim 4, wherein said one or more wireless devices further comprise one or more connected wireless sensors.

8. A multimode switch, comprising:
- an actuator, configured to indicate a state responsive to a change in actuation;
- a wireless transceiver, configured to transmit and receive messages over a wireless network;
- a line voltage switch, coupled to a line voltage and to one or more wireless devices; and
- a switch controller, configured to direct said line voltage switch to provide said line voltage to, and subsequently remove line voltage from, said one or more wireless devices, and configured to receive first identifying information and functional group designation for said one or more wireless devices in second messages over said wireless network, and configured to thereafter control said one or more wireless devices according to said identifying information and functional group designation and said state via transmission of third messages over said wireless network.

9. The multimode switch as recited in claim 8, wherein said switch controller directs said line voltage switch to provide said line voltage to, and subsequently remove line voltage from, said one or more wireless devices responsive to first messages received over said wireless network to allow for discovery and commissioning of said one or more wireless devices.

10. The multimode switch as recited in claim 8, wherein said switch controller directs said line voltage switch to provide said line voltage to, and subsequently remove line voltage from, said one or more wireless devices responsive to said change in actuation, thereby allowing for discovery and commissioning of said one or more wireless devices.

11. The multimode switch as recited in claim 8, wherein said one or more wireless devices comprise one or more wireless lighting fixtures.

12. The multimode switch as recited in claim 11, wherein said one or more wireless lighting fixtures comprise wireless fluorescent lights.

13. The multimode switch as recited in claim 11, wherein said one or more wireless lighting fixtures comprise wireless light-emitting diode lights.

14. The multimode switch as recited in claim 11, wherein said one or more wireless devices further comprise one or more connected wireless sensors.

15. A multimode switch method, comprising:
- via a wireless transceiver, transmitting and receiving messages over a wireless network;
- coupling a line voltage switch to a line voltage and to one or more wireless devices; and
- via a switch controller, responsive to first messages received over the wireless network, directing the line voltage switch to provide the line voltage to, and subsequently remove line voltage from, the one or more wireless devices; receiving first identifying information and functional group designation for the one or more wireless devices in second messages over the wireless network; and thereafter controlling the one or more wireless devices according to the identifying information and functional group designation via transmission of third messages over the wireless network.

16. The method as recited in claim 15, wherein the switch controller directs the line voltage switch to provide the line voltage to, and subsequently remove line voltage from, the one or more wireless devices to allow for discovery and commissioning of the one or more wireless devices.

17. The method as recited in claim 15, wherein the switch controller is configured to transmit second identifying information for capture by a commissioning device.

18. The method as recited in claim 15, wherein the one or more wireless devices comprise one or more wireless lighting fixtures.

19. The method as recited in claim 18, wherein the one or more wireless lighting fixtures comprise wireless fluorescent lights.

20. The method as recited in claim 18, wherein the one or more wireless lighting fixtures comprise wireless light-emitting diode lights.

\* \* \* \* \*